(12) United States Patent
Coral (10) Patent No.: US 10,897,458 B1
(45) Date of Patent: Jan. 19, 2021

(54) ENHANCING SECURE CLIENT EXPERIENCE THROUGH SELECTIVE ENCRYPTION OF COOKIES

(71) Applicant: CyberArk Software Ltd., Petach-Tikva (IL)

(72) Inventor: Neta Coral, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/839,788

(22) Filed: Apr. 3, 2020

(51) Int. Cl.
*H04L 29/06* (2006.01)

(52) U.S. Cl.
CPC ...... *H04L 63/0471* (2013.01); *H04L 63/0236* (2013.01); *H04L 63/0245* (2013.01); *H04L 63/0281* (2013.01); *H04L 67/42* (2013.01)

(58) Field of Classification Search
CPC ............. H04L 63/0471; H04L 63/0245; H04L 63/0281; H04L 67/42; H04L 63/0236
See application file for complete search history.

(56) References Cited

U.S. PATENT DOCUMENTS

| | | | | |
|---|---|---|---|---|
| 6,772,333 B1* | 8/2004 | Brendel | ........... | H04L 63/04 709/227 |
| 6,851,060 B1* | 2/2005 | Shrader | ........... | G06F 21/6263 726/10 |
| 6,985,953 B1* | 1/2006 | Sandhu | ........... | G06F 21/31 709/229 |
| 7,779,103 B1* | 8/2010 | Fikes | ........... | G06F 21/6263 709/219 |
| 7,941,550 B1* | 5/2011 | Smith | ........... | H04L 67/14 709/228 |
| 8,200,833 B1* | 6/2012 | Lau | ........... | H04L 63/168 709/227 |
| 8,490,165 B2* | 7/2013 | Wray | ........... | H04L 63/0823 726/6 |
| 8,850,520 B1* | 9/2014 | Pike | ........... | G06F 21/33 726/3 |
| 8,856,869 B1* | 10/2014 | Brinskelle | ........... | G06F 21/31 726/2 |
| 10,270,792 B1* | 4/2019 | Shemesh | ........... | H04L 63/1441 |
| 2004/0103200 A1* | 5/2004 | Ross | ........... | H04L 69/329 709/228 |
| 2006/0036875 A1* | 2/2006 | Karoubi | ........... | H04L 9/00 713/191 |

(Continued)

*Primary Examiner* — Darren B Schwartz
(74) *Attorney, Agent, or Firm* — Finnegan, Henderson, Farabow, Garrett & Dunner LLP (57) ABSTRACT

Disclosed embodiments relate to systems and methods for enhancing secure client experience through selective encryption of cookies. Techniques include using a proxy resource configured to selectively encrypt cookies exchanged between a client application and a target application through software-based operations. Operations may comprise receiving at the proxy resource, from the target application, a cookie that was provisioned for the client application, inspecting one or more attributes of the cookie, and selectively determining, based on the one or more attributes and before sending the cookie to the client application, whether to encrypt the cookie. Further techniques include developing a before-and-after comparison of the client application functionality using a cookie with encryption and a cookie without encryption.

19 Claims, 6 Drawing Sheets

(56) References Cited

U.S. PATENT DOCUMENTS

| | | | | |
|---|---|---|---|---|
| 2007/0245137 | A1* | 10/2007 | Bhagat | H04L 67/146 |
| | | | | 713/153 |
| 2010/0043065 | A1* | 2/2010 | Bray | H04L 63/0815 |
| | | | | 726/8 |
| 2011/0055563 | A1* | 3/2011 | Chandran | H04L 9/0891 |
| | | | | 713/168 |
| 2011/0283110 | A1* | 11/2011 | Dapkus | G06F 21/577 |
| | | | | 713/182 |
| 2012/0173870 | A1* | 7/2012 | Reddy | H04L 63/0428 |
| | | | | 713/153 |
| 2014/0325680 | A1* | 10/2014 | Yang | H04L 67/02 |
| | | | | 726/28 |
| 2015/0052586 | A1* | 2/2015 | Mills | H04L 63/0428 |
| | | | | 726/4 |
| 2015/0363774 | A1* | 12/2015 | Priebatsch | G06Q 20/38215 |
| | | | | 705/75 |
| 2015/0379072 | A1* | 12/2015 | Dirac | G06N 20/00 |
| | | | | 707/693 |
| 2016/0226832 | A1* | 8/2016 | Garreau | H04L 63/168 |
| 2016/0330220 | A1* | 11/2016 | Dulkin | H04L 63/1408 |

* cited by examiner

ENHANCING SECURE CLIENT EXPERIENCE THROUGH SELECTIVE ENCRYPTION OF COOKIES

BACKGROUND

Cyber-attackers often attempt to gain access to secure applications to steal or modify data, improperly use resources, elevate their privileges, or perform other unauthorized actions. One way that attackers may gain access to secure applications is by acting as an authorized user and sending the secure target application a phony access request. One way to help mitigate unauthorized access is by using cookies containing unique data to identify the user or the user's client application. However, if an attacker is able to steal the cookies, the attacker may still trick the secure application into granting access to the attacker.

Schemes for mitigating cookie theft through encryption have been attempted, but these schemes can present problems with functionality of the user's client application. Often a client application will use some of the data in cookies received from the secure application to provide client-side functionality. However, when a cookie containing a data value is encrypted, the client application may not be able to access the data value needed to provide the functionality. Therefore, current schemes that encrypt all cookies transmitted from a target application may cause the client application to lose functionality and may diminish the user experience provided by the client application.

Accordingly, solutions are needed for selectively encrypting cookies such that some cookies (or certain cookie fields) are sent in encrypted form, while other cookies (or fields thereof) are not encrypted. Solutions should advantageously inspect cookies and determine which cookies (or fields) need to be sent unencrypted to the client application to permit its full functionality.

SUMMARY

The disclosed embodiments describe non-transitory computer readable media, systems, and methods for enhancing a secure client experience through selective encryption of cookies. For example, in an exemplary embodiment, there may be a proxy resource configured for deployment between a client application and a target application. The proxy resource may be configured to selectively encrypt cookies exchanged between the client application and the target application through software-based operations that may comprise: receiving at the proxy resource, from the target application, a cookie that was provisioned for the client application; inspecting one or more attributes of the cookie; and selectively determining, based on the one or more attributes and before sending the cookie to the client application, whether to encrypt the cookie; wherein the client application may be configured to use the cookie in unencrypted form for functionality it could not perform with the cookie in encrypted form.

According to a disclosed embodiment, the functionality may include a visible user experience of the client application.

According to a disclosed embodiment, the software-based operations may further comprise: encrypting the cookie; sending the encrypted cookie to the client application; receiving a request, from the client application, for access to the target application, wherein the request includes the encrypted cookie; decrypting the encrypted cookie; and sending the decrypted version of the encrypted cookie to the target application.

According to a disclosed embodiment, the one or more attributes of the cookie may include a value in the cookie.

According to a disclosed embodiment, the value may be defined as at least one of: a number of characters, specific content, or a pattern of content.

According to a disclosed embodiment, the one or more attributes of the cookie may include a name of the cookie.

According to a disclosed embodiment, the name may be defined based on at least one of: a whitelist of names, a blacklist of names, or a user-adjustable definition.

According to another disclosed embodiment, a method may be implemented for selectively encrypting cookies exchanged between a client application and a target application. The method may comprise receiving at a proxy resource deployed between the client application and the target application, from the target application, a cookie that was provisioned for the client application; inspecting one or more attributes of the cookie; and selectively determining, based on the one or more attributes and before sending the cookie to the client application, whether to encrypt the cookie; wherein the client application is configured to use the cookie in unencrypted form for functionality it could not perform with the cookie in encrypted form.

According to a disclosed embodiment, the method may further comprise: selectively determining not to encrypt the cookie; and providing the cookie, without encryption, to the client application.

According to a disclosed embodiment, the method may further comprise: selectively determining to encrypt a portion but not all portions of the cookie; and providing the cookie with the portion encrypted to the client application.

According to a disclosed embodiment, the proxy server may be a server physically separate from the client application and the target application.

According to a disclosed embodiment, the may further comprise developing a before-and-after comparison comprising: selectively determining to provide the cookie without encryption to the client application; selectively determining to provide the cookie with encryption to the client application; obtaining a first result of functionality of the client application based on the cookie without encryption; obtaining a second result of functionality of the client application based on the cookie with encryption; and generating a comparison of the first result to the second result.

According to a disclosed embodiment, the comparison may indicate an ability of the client application to load data or documents.

According to a disclosed embodiment, the comparison may indicate an ability of the client to make external connections.

According to another disclosed embodiment, there maybe a non-transitory computer readable medium including instructions that, when executed by at least one processor, may cause the at least one processor to perform operations for provisioning cookies to a proxy resource that selectively encrypts cookies. The operations may comprise provisioning a cookie for a client application; transmitting the cookie to a proxy resource that is configured to inspect one or more attributes of the cookie and selectively determine, based on the one or more attributes and before sending the cookie to the client application, whether to encrypt the cookie; wherein the client application is configured to use the cookie in an unencrypted form for functionality it could not perform with the cookie in encrypted form.

According to a disclosed embodiment, the selectively determining may be based on a machine learning algorithm.

According to a disclosed embodiment, the machine learning algorithm may be a statistical classification algorithm.

According to a disclosed embodiment, the machine learning algorithm may be a manually trained algorithm.

According to a disclosed embodiment, the provisioning may occur at a system hosting a target application with which the client application is configured to communicate.

According to a disclosed embodiment, both the client application and the target application may be configured to use the cookie to perform at least a part of their functionality.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of enhancing a secure client experience through selective encryption of cookies, as described herein, overcome several technological problems relating to the security and usability of computing devices and applications. As described below, the disclosed embodiments provide techniques for inspecting and selectively determining whether to encrypt a cookie in order to maximize the functionality of a client application. Cookies are used for many network communications and to provide pieces of data to applications. For example, as described below, cookies may be used by a target application to identify a user or the user's client device. In some cases, the target application may send a cookie containing a unique identifier to the client device. In later sessions, the client device may then send the cookie containing the identifier back to the target application, which may verify the device's identity. In addition to user data, cookies may also contain parameters, settings, and data values used by client applications. As such, cookies with these types of information may be important to a client application's ability to process data and provide its proper functionality.

While useful for many applications, cookies may present security risks. A malicious actor may be able to hijack a user's connected session by copying a cookie value and providing the value to the target application. For example, a hacker could implement a Cross-Site Request Forgery ("CSRF") attack. As an example, the CSRF attack may be mounted by tricking the user of the client application into clicking on a malicious link. By clicking on the link, the user may cause the cookies stored on the client device 120 to be transmitted to a device of the attacker. The attacker, masquerading as the legitimate user, may then use the cookies to send a phony request to the target application, thereby gaining access to the target application. Additionally, cookies may contain user data such as prior website browsing activity. shopping cart contents, tokens or keys, and various other types of sensitive data.

This may be mitigated by using an intermediary proxy resource to encrypt the cookies sent from the target application. This may be implemented by the target application sending the cookies to a proxy resource. The proxy resource may then encrypt the cookies and send the encrypted versions to the client application. When the client device is to send cookies back to the target application, the client device may send them to the proxy resource. The proxy resource may then decrypt the cookies and send them back to the target application. In this way, the decrypted versions of the cookies are not exposed to the client device. Thus, an attack attempt by a malicious actor may be thwarted because the malicious actor may at best be able to access the encrypted version of the cookies form client device.

While cookie encryption through a proxy resource may facilitate a secure connection between a target application and a client application, encryption of all cookies sent to the client application may cause functionality problems. In some cases, client applications may use certain cookies for their own functionality. For example, the cookies may contain data values that the client application uses to provide functionality, such as loading webpages or images, formatting data, processing data, retrieving other data, etc. However, when a cookie containing a data value is encrypted, the client application may not be able to access the data value needed to provide a certain functionality. Accordingly, while encryption may provide a more secure connection between a target application and client application, it may also cause the client application to lose some functionality or to not function property altogether.

Disclosed embodiments provide solutions for selectively encrypting cookies. Selectively encrypting some, but not necessarily all, cookies sent by the target application may increase the security of a connection by preventing malicious access to some cookies needed for authentication, but still providing the client application with data values needed to maximize its functionality. Accordingly, selectively encrypting cookies can enhance the visual and/or interactive experience presented to a user by the client application by maximizing the functionality that the client application is able to provide while still ensuring a secure connection by limiting security risks.

Reference will now be made in detail to the disclosed embodiments, examples of which are illustrated in the accompanying drawings.

Figure 1:
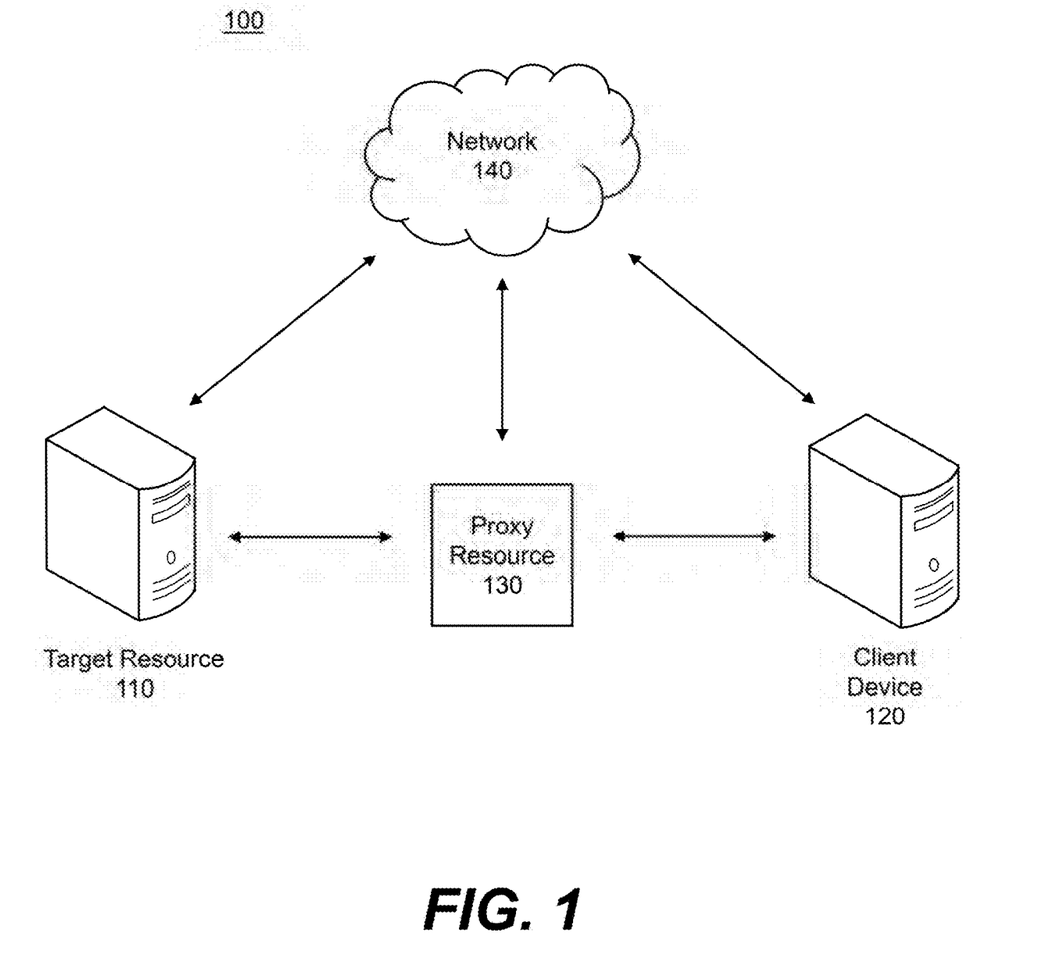
FIG. 1 is a block diagram of an exemplary system for selectively encrypting cookies exchanged between a client application and a target application in accordance with disclosed embodiments.

FIG. 1 is a block diagram of an exemplary system 100 for selectively encrypting cookies exchanged between a client application and a target application in accordance with disclosed embodiments. System 100 may include a target device 110, a client device 120, a proxy resource 130, and a network 140, as shown in FIG. 1 and discussed further below.

Target resource 110 may be a variety of types of computing devices, such as a personal computer (e.g., a desktop or laptop), a server, a virtual machine (e.g., virtualized computer, container instance, etc.), or similar. In some embodiments, target resource 110 may include one or more virtual machines or virtualized instances, which may be based on virtualization tools provided by Amazon Web Services™ (AWS™), Microsoft Azure™, IBM Cloud™, Google Cloud Platform™, Cisco Metapod™, Joyent™, vmWare™, or others. Target resource 110 may include a target application. For example, target resource 110 may include an application stored in memory or an application executed within a virtual computing environment. In some embodiments, the target application may be a Software as a Service platform or other cloud computing service. In other embodiments, the target application may be another website, application, or service, such as Facebook™, Twitter™, Salesforce™, Skrill™, Ansible Tower™, and the like.

System 100 may also include a client device 120. Client device 120 may include a variety of different types of computing devices. For example, client device 120 may be a personal computer (e.g., a desktop or laptop), an IoT device (e.g., sensor, smart home appliance, printer, connected vehicle, industrial device, etc.), a server, a mainframe, a virtual machine (e.g., virtualized computer, container instance, etc.), or similar. Client device 120 may also be a handheld device (e.g., a mobile phone, a tablet, notebook, digital camera, etc.), a wearable device (e.g., a smart watch, smart jewelry, an implantable device, a fitness tracker, smart clothing, a head-mounted display, etc.), or various other devices capable of processing and/or receiving data.

In certain embodiments, client device 120 may be a terminal-based (e.g., Unix or Linux) computing device. For example, the client device 120 may provide only a terminal interface for interacting with the system. In some embodiments, by contrast, client device 120 may operate using a visual operating system, such as a Windows™ operating system, Apple™ operating system, Android™ operating system, a cloud-based operating system (e.g., through AWS™, Azure™, IBM Cloud™, etc.), or other types of non-terminal operating systems.

Client device 120 may include one or more processors and one or more memories. The processor (or processors) of client device 120 may include one or more data or software processing devices. For example, the processor may take the form of, but is not limited to, a microprocessor, embedded processor, or the like, or may be integrated in a system on a chip (SoC). Furthermore, according to some embodiments, the processor may be from the family of processors manufactured by Intel®, AMD®, Qualcomm®, Apple®, NVIDIA®, or the like. The processor may also be based on the ARM architecture, a mobile processor, or a graphics processing unit, etc. The disclosed embodiments are not limited to any particular type of processor configured in the client device 120.

Memory (or memories) of client device 120 may include one or more storage devices configured to store instructions used by the processor to perform functions related to the disclosed embodiments. The memory may be configured to store software instructions, such as programs, that perform one or more operations when executed by the processor. The disclosed embodiments are not limited to particular software programs or devices configured to perform dedicated tasks. For example, the memory may store a single program, such as a user-level application, or may comprise multiple software programs. The memory may also include an operating system. As described above, the operating system may include a Windows™ operating system, Apple™ operating system, Android™ operating system Linux operating system, a cloud-based operating system, or other types of operating systems. Additionally, the processor may in some embodiments execute one or more programs (or portions thereof) remotely located from the client device 120. Furthermore, the memory may include one or more storage devices configured to store data for use by the programs.

Client device 120 may include one or more client applications. A client application may be stored in memory and executed by one or more processors of client device 120. The client application may be, for example, a web browser or other application for connecting to the internet or target resource 110. As another non-limiting example, the client application may be a local application (e.g., a word processor) that uses target resource 110 for remote storage. The client application may also be a web or cloud-based application accessed by client device 120.

System 100 may also include a proxy resource 130. Proxy resource 130 may be a variety of types of computing devices, for example, a server, personal computer, virtual machine (e.g., virtualized computer, container instance, etc.), or similar. Proxy resource 130 may be configured to send and receive cookies or other data from other components of system 100. According to disclosed embodiments, proxy resource 130 may serve as an intermediary between target resource 110 and client device 120. For example, proxy resource 130 may be a proxy server or agent that receives web requests from a client device 120 (e.g., a user's personal computer) and forwards the requests to target resource 110 (e.g., a web server). Proxy resource 130 may include a service for managing session access, such as CyberArk's Privileged Session Management™ or CyberArk's Privileged Session Management for Web.

In some embodiments, proxy resource 130 may be a server physically separate from the client device 120 (and client application) and target resource 110 (and target application). In other embodiments, proxy resource 130 may be part of target resource 110 or a target application. For example, proxy resource 130 may be an application, agent, microservice, or other software in target resource 110 configured to execute one or more steps of processes 200 or 400 below.

In some embodiments, proxy resource 130 may be configured to encrypt or decrypt cookies or other data. Encryption may be implemented through one or more types of encryption or encryption algorithms (e.g., symmetric encryption, asymmetric encryption, AES, RSE, Twofish, etc.). In some embodiments, proxy resource 130 may include a machine learning tool or library, for example, IBM Watson™, Apache Spark™, Scikit Learn™, TensorFlow™, Google Cloud AI™, etc. As described below, the machine learning tool may be used in processes 200 and 400 below to implement selective cookie encryption.

Target resource 110 and client device 120 may be in communication with proxy resource 130, as shown in FIG. 1. In some embodiments, target resource 110 and client device 120 may be in communication with proxy resource 130, or each other, directly. Alternatively, or in addition, target resource 110 and client device 120 may be in communication with proxy resource 130 over network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Target resource 110 may employ the use of cookies to provide functionality to the target application, authenticate users, manage sessions, etc. For example, a user may enter credentials to login to the target application using the client application on the user's client device. After the user sends his or her credentials to the target resource 110, the target application may set one or more cookies on the client application. In some embodiments, the cookies may be used to identify the user or provide other data to the target application. Cookies may also be used to send other data, such as user preferences, application parameters, data values, or other settings to and from the target application or client application. The disclosed embodiments are not limited to using cookies during an authentication process. For example, cookies containing other data may be sent before or after an authentication process.

Figure 2:
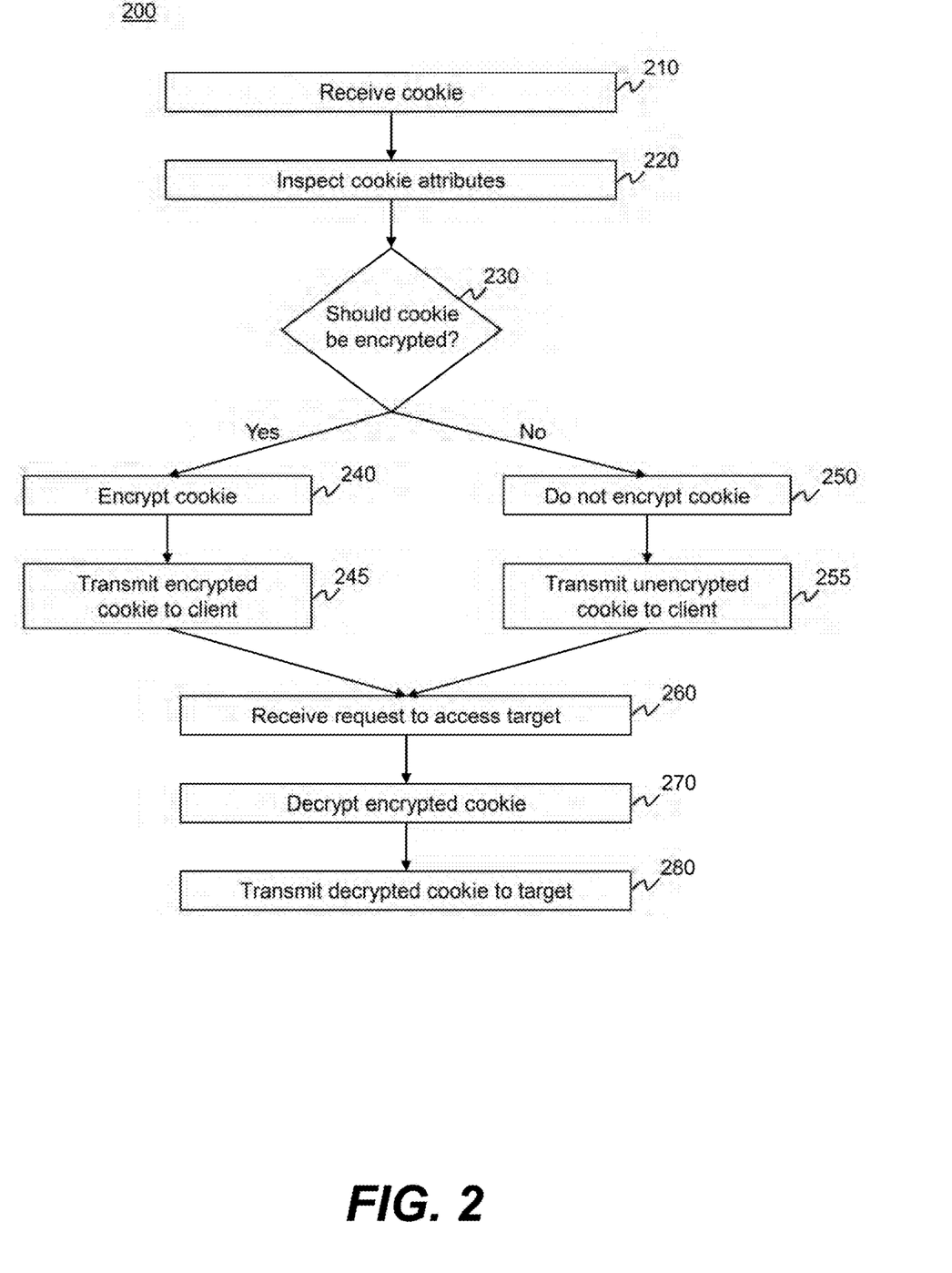
FIG. 2 is a flowchart depicting an exemplary process for selectively encrypting cookies exchanged between a client application and a target application in accordance with disclosed embodiments.

FIG. 2 is a flowchart depicting an exemplary process 200 for selectively encrypting cookies exchanged between a client application and a target application in accordance with disclosed embodiments. Process 200 may be executed by, for example, proxy resource 130.

At step 210, process 200 may include receiving a cookie. For example, proxy resource 130 may receive a cookie from target resource 110. In some embodiments, target resource 110 may send a cookie to proxy resource 130 in response to receiving an authorization request or authorization credentials from a user application (e.g., client application of client device 120). As described above, a cookie may include data identify a user or identity, or other data. The cookie may be, for example, an HTTP cookie, a Java cookie, Flash cookie, or other types of cookies.

At step 220, process 200 may include inspecting one or more attributes of the cookie. Attributes of a cookie may include a value in the cookie, cookie name, file size, expiration information. URL path, etc. In some embodiments, inspecting the attributes of a cookie may include identifying predetermined attributes of the cookie. For example, proxy resource 130 may be configured to identify a value of the cookie and/or the cookie name. In some embodiments, a cookie may be a data file containing multiple pieces of data, e.g., in a JSON or similar format. Proxy resource 130 may be configured to parse the data file and identify the individual data values within the file.

At step 230, process 200 may include selectively determining whether to encrypt the cookie. The selective determination may be based on the one or more attributes of the cookie. For example, proxy resource 130 may determine, based on attributes of the cookie identified at step 220, that a certain cookie should or should not be encrypted. Whether a cookie is encrypted or not may impact the functionality of client application on the client device. For example, a client application may be configured to use a cookie in an unencrypted form for functionality that it could not perform with the cookie in an encrypted form. In some cases, the functionality of the client application may affect the user experience presented to the user of the client application. The functionality of the client application and the user experience are described in further exemplary detail below with respect to FIGS. 3A and 3.

In some embodiments, the determination in operation 230 may be made based on one or more specified criteria. If the criteria are met, proxy resource 130 may not encrypt the cookie in operation 250. If the criteria are not met, proxy resource 130 may encrypt the cookie in operation 240. The criteria may specify one or more attributes that a cookie may have in order to be encrypted or not encrypted. For example, criteria related to the value of the cookie may specify a specific number of characters, specific content, or a specific pattern of content. As another example, criteria relating to the name of the cookie may define a whitelist of names (e.g., cookie names that are not to be encrypted), a blacklist of names (e.g., cookie names are always to be encrypted), or a user-defined definition.

The determination of whether to encrypt a cookie in operation 230 may be made, for example, by comparing identified attributes of the cookie with the criteria identified in operation 220. For example, specified criteria may indicate that a cookie should not be encrypted if the cookie's name contains the strings "locale" or "location" or its value is "TRUE." In this example, proxy resource 130 may identify the name of a cookie as "XYZlocale" and having a value of "FALSE." Proxy resource 130 may compare the name and value of the cookie with the specified criteria and determine that the cookie should not be encrypted because the name includes the string "locale."

In some embodiments, proxy resource 130 may inspect cookie attributes (step 220 above) based on the specified criteria. For example, if the specified criteria only related to cookie name, proxy resource 130 may only inspect the cookie name at step 220. As another example, if the specified criteria only relate to cookie value, proxy resource 130 may only inspect a cookie's value at step 220.

In some embodiments, criteria may be determined based on the functionality of a cookie that meets the criteria. For example, it may be determined that cookies with a certain string in their name, or cookies of a certain value, are often required for certain functionality on the client side. In some cases, such cookies may improve the user experience on the client side. Cookie functionality and the user experience are described in greater detail below.

In some embodiments, the criteria identified in operation 220 may be predetermined. For example, proxy resource 130 may store predetermined criteria for determining whether to encrypt a cookie. The predetermined criteria may be default or factory criteria, or may be user-configurable.

In some embodiments, proxy resource 130 may receive criteria from other components of system 100, for example, client device 120, target resource 110, or a target application. Proxy resource 130 may also receive criteria through network 140 from a user or organization associated with target device 110 or a target application. For example, an operator of a target application may know that certain cookies should not be encrypted in order for the target/client relationship to function property. In such a case, the operator of the target application may specify the names, for example, of certain cookies to not be encrypted by proxy resource 130.

In some embodiments, step 230 may include developing the criteria to inspect in operation 220. For example, patterns in cookie attributes may be identified. The patterns may indicate that cookies with a certain attribute are more likely or less likely to affect the client-side functionality when encrypted.

In some embodiments, selectively determining whether to encrypt a cookie may be based on a machine learning algorithm. The machine learning algorithm may be used to identify whether a cookie should be encrypted based on the attributes of the cookie. The machine learning algorithm may be a classification algorithm (e.g., logistic regression, naïve Bayes, decision tree, random forest, neural network, etc.). The classification algorithm may be configured to classify a given cookie as to be encrypted or not to be encrypted. According to disclosed embodiments, the machine learning algorithm may be manually trained. For example, the machine learning algorithm may be trained using an input dataset of cookies with preidentified criteria and a predetermined indication of whether the cookie should be encrypted.

In some embodiments, the machine learning algorithm may be dynamically updated over time. For example, the machine learning algorithm may be updated based on feedback from a client application. As an example, when the client application receives an encrypted cookie and some part of the client application functionality does not work as expected, the client device 120 may send an indication of the effect on functionality to proxy resource 130. Over time, the machine learning algorithm may determine that specific cookies, or cookies having certain attributes, cause problems when encrypted, and should therefore be sent unencrypted. Accordingly, the algorithm may be trained dynamically and over time to adjust the criteria used to make the encryption determination in operation 230.

If proxy resource 130 determines that the cookie should be encrypted, process 200 may proceed to step 240 and encrypt the cookie. The cookie may be encrypted such that third parties cannot access the data within the cookie. Proxy resource 130 may encrypt a cookie using an encryption key stored by proxy resource 130. In some embodiments, the encryption key or keys may only be accessible by proxy resource 130. At step 245, process 200 may include transmitting the encrypted cookie to client device 120.

If proxy resource 130 determines that the cookie should not be encrypted, process 200 may proceed to step 250 and not encrypt the cookie. At step 255, process 200 may include transmitting the unencrypted cookie to client device 120.

In some embodiments, proxy resource 130 may encrypt a portion of a cookie, but not encrypt other portions of the same cookie. For example, a cookie containing multiple fields may include multiple data values, multiple parameters, multiple references to other data, etc. The multiple fields may be used for different purposes. Accordingly, some values may be able to be encrypted without affecting the functionality of the client application. Other data values in the same cookie, however, may adversely affect the functionality of the client application when encrypted. Accordingly, in some cases it may be desirable to encrypt only some of the data values within the cookie. In some cases, fields within the cookie may be selectively and individually encrypted. In other embodiments, the entire original cookie may be encrypted, and a new unencrypted cookie may be created containing the data values not to be encrypted. In such embodiments, both the encrypted original cookie and the new unencrypted cookie may be transmitted to the client device 120.

As an example, a cookie containing multiple data values may be in a JSON or similar format. Proxy resource 130 may parse the JSON-formatted cookie automatically and identify data values to be encrypted or not encrypted. The data values within the file may be individually encrypted and then the partially encrypted cookie may be transmitted to client device 120. Alternatively, or additionally, a new JSON-formatted cookie may be created containing only the value not to be encrypted. Proxy resource 130 may encrypt the entire original cookie, or a create a second new cookie containing only the values to be encrypted. The entire second new cookie could be encrypted. Proxy resource 130 could then transmit both new cookies, or the new encrypted cookie and the encrypted original cookie to client device 120. The client application of client device 120 may then use the data from the unencrypted cookie.

At step 260, process 200 may include receiving a request to access the target device 110 or target application. Proxy resource 130 may receive a request from the client application on client device 120 to access the target application. The request may include the one or more encrypted or unencrypted cookies sent to client device 120 at steps 245 and/or 255.

At step 270, process 200 may include decrypting the received encrypted cookie. Proxy resource 130 may decrypt the cookie using the stored encryption key.

At step 280, process 200 may include transmitting the decrypted cookie to target resource 110 for use by the target application. For example, if the cookie is a session cookie, upon receiving the decrypted cookie, the target application may authorize the user of the client application and grant the user access.

Figure 3A:
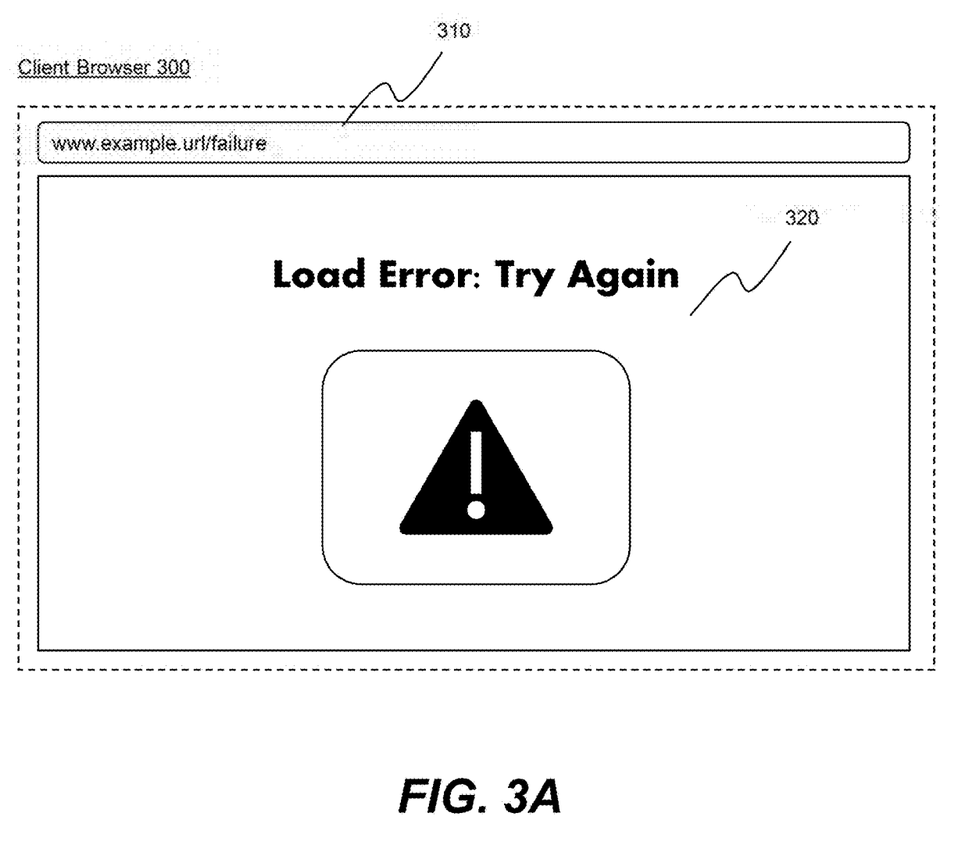
FIG. 3A is an illustration of an exemplary client application in accordance with disclosed embodiments.
Figure 3B:
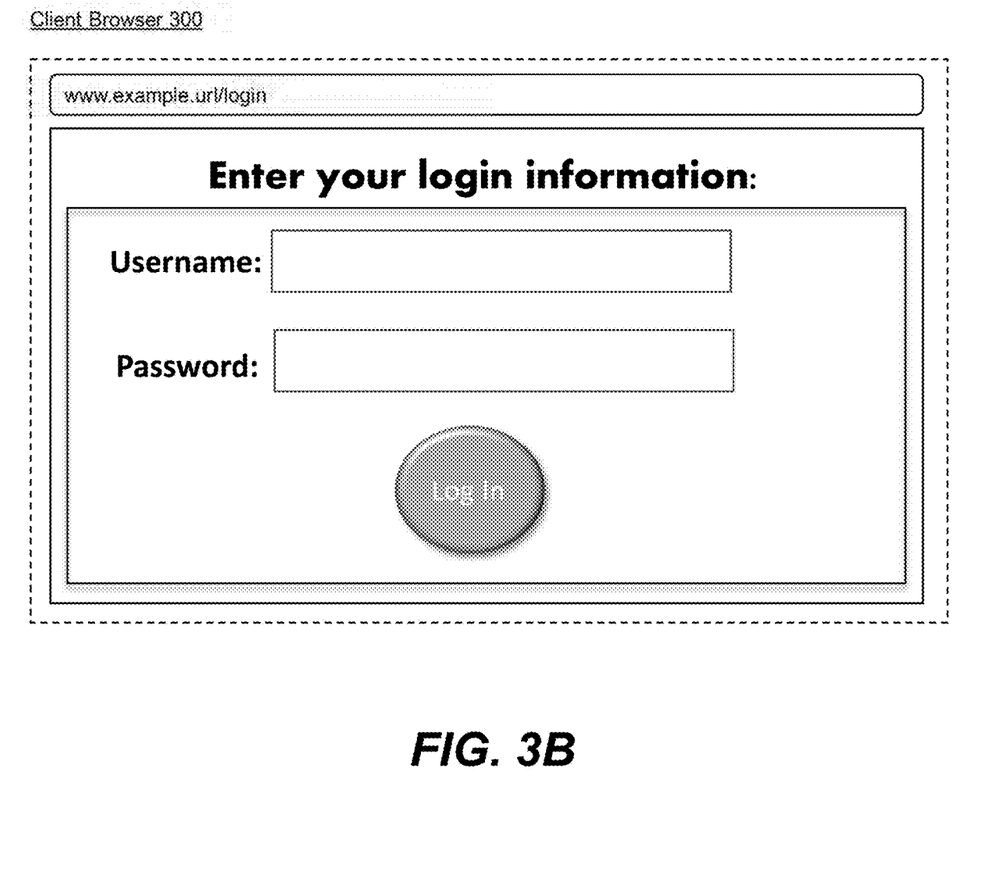
FIG. 3B is an illustration of an exemplary client application in accordance with disclosed embodiments.

FIG. 3A is an illustration of an exemplary client application in accordance with disclosed embodiments. FIG. 3A depicts an exemplary client browser application 300. Client browser 300 is one example of possible client application executed by client device 120. Client browser 300 may be a variety of applications used to access the internet, such as Google Chrome™, Microsoft Edge™, Mozilla Firefox™, Safari™, and the like. Client browser 300 may be executed on client device 120 to facilitate internet access by a user. For example, user may enter a web address into field 310 to direct the browser to a specific location on network 140 to connect to proxy resource 130 or target resource 110.

When a user attempts to access a target application, the target application may transmit one or more cookies to the client application. Cookies may facilitate functionality of both the target application and the client application. In some embodiments, a cookie may be a session or authentication cookie that identifies the user or target application. Other cookies may transmit data for use by the client application. Various other types of cookies are possible as well, including permanent cookies, third party cookies, etc.

In some cases, cookies sent by the target application to the client application may include data values or parameters needed for certain functionality on the client side. For example, these data values or parameters may permit certain pages, images, interfaces, toolbars, plugins, or documents to load and be displayed. As another example, an element of client application functionality may be implemented by JavaScript based on a cookie data value. Thus, when a cookie containing a needed data value or parameter is encrypted, the client application may not be able to access the data value or parameter. Accordingly, client application functionality may fail or suffer when cookies are encrypted. Such a failure may include, for example, the failure to load a login page, a failure to load an image, a session timeout, connection failure, etc. FIG. 3A illustrates an exemplary failure of functionality of the client application when a cookie needed for functionality of the client application is encrypted. Error message 320 may be displayed when, for example, all of the cookies received by the client device 120 are encrypted. The error message may, indicate the failure to load a login page, a session timeout, etc. Accordingly, the user experience provided by the client application is negatively affected because the client application cannot properly function.

As an example, the client application may perform a check of a data value contained within a cookie before permitting a successful connection to the target application. If the data value is not present in a cookie received from the target application, the client application may not permit the connection to be established. Thus, if the cookie containing the data value is encrypted, the client application may not be able to check the data value and may not permit the connection to be established. Similarly, a client application may not load a webpage, image, document, interface, frame, toolbar, plugin, etc. if a data value cannot be accessed.

As another example, a client application may load a webpage in a specific language, based upon a language value identified in a cookie. If the cookie containing the language value is encrypted, the client application may not be able to access it. Thus, the client application may not load the webpage because it cannot access the language data. In some cases, the client application may load the webpage in a default language. However, this could negatively affect the user experience provided by the client application because the default language may not be the user's preferred language.

As yet another example, a cookie transmitted from the target application may include a pre-encrypted data value or a JSON format that may be ruined by encryption.

In a further example, as part of its functionality, the client application may verify the structure or format of a cookie. The client application may be configured to verify that the cookie or a data value of a cookie is presented with a certain format or structure. In some cases, encryption of the cookie or data value may alter the original structure and cause the verification to fail, thus adversely affecting the client application's functionality.

FIG. 3B is an illustration of an exemplary client application in accordance with disclosed embodiments. Specifically, FIG. 3B illustrates an exemplary desired functionality of a client application in browser 300 when one or more cookies from the target application are not encrypted. For example, rather presenting an error message as illustrated by FIG. 3A, the client application may successfully load the desired webpage, image, frame, interface, toolbar, plugin, documents, etc. This difference in functionality may occur when a certain cookie is encrypted (FIG. 3A) and when the same cookie is not encrypted (FIG. 3B). Thus, a client application may be configured to use the cookie in unencrypted form for functionality it could not perform with the cookie in encrypted form. As illustrated in FIG. 3B, the functionality may include a visible user experience of the client application, such as a loaded webpage, image, documents, etc. Therefore, through selective encryption of cookies, the user experience provided by the client application may be improved by providing security along with full functionality of the client application.

While FIGS. 3A and 3B illustrate a visible effect of cookies on the user experience provided by the client application, disclosed embodiments are not limited to visible effects. For example, the cookie data may be used in backend functioning of the client application that may not be explicitly visible to the user (e.g., based on a plugin or applet), but may still affect the user experience. Nonvisible effects may include application speed, accuracy of data provided to the user, types of data that can be processed, types of interfaces that can be displayed, etc.

Figure 4:
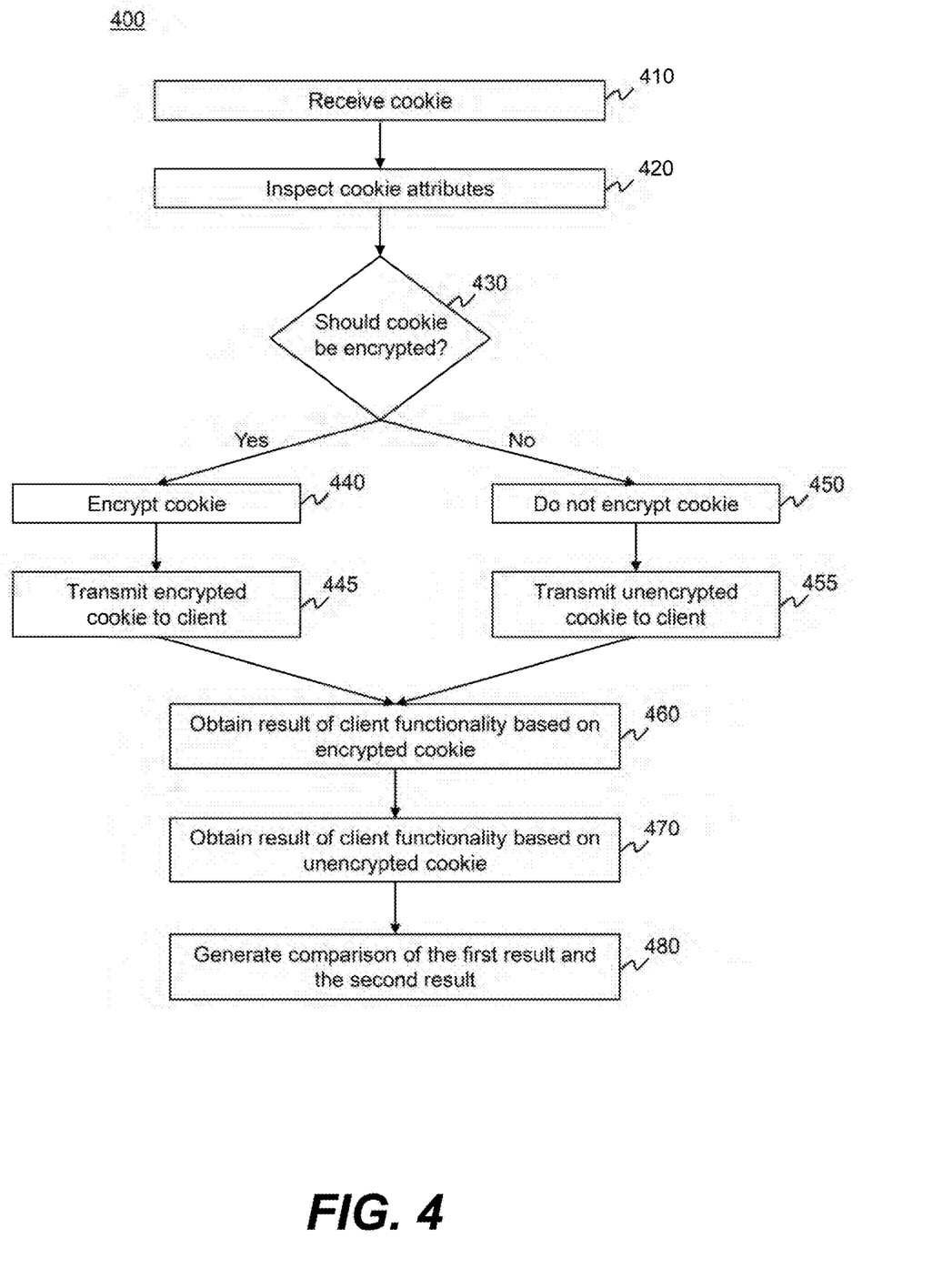
FIG. 4 is a flowchart depicting an exemplary process for selectively encrypting cookies exchanged between a client application and a target application and generating a comparison in accordance with disclosed embodiments.

FIG. 4 is a flowchart depicting an exemplary process 400 for selectively encrypting cookies exchanged between a client application and a target application, and generating a comparison in accordance with disclosed embodiments. Process 400 may be executed, for example, by proxy resource 130. Process 400 may be used by proxy resource 130 to determine if a cookie should be transmitted to client device 120 unencrypted or encrypted. Parts of process 400 may correspond to parts of process 200 in FIG. 2 and, accordingly, descriptions of the components and processes therein may apply to process 400 as well.

At step 410, process 400 may include receiving a cookie from target resource 110. Receiving a cookie may occur substantially as described with respect to step 210 of process 200.

At step 420, process 400 may include inspecting cookie attributes. Inspecting cookie attributes may occur substantially as described with respect to step 220 of FIG. 2.

At step 430, process 400 may include selectively determining whether the cookie should be encrypted. Selectively determining may occur substantially as described with respect to step 230 of FIG. 2. In process 400, proxy resource 130 may determine that the same cookie should be sent both encrypted and unencrypted. Accordingly, at steps 440 and 445, proxy resource 130 may encrypt and transmit the encrypted cookie to the client application. Proxy resource 130 may also not encrypt the cookie and transmit the unencrypted cookie to the client application at step 450 and 455.

At step 460, process 400 may include obtaining a first result of functionality of the client application based on the encrypted cookie. The client application may send an indication to proxy resource 130 of the client application's functionality based on the encrypted cookie. For example, the encrypted cookie may adversely affect the functionality of the client application, as illustrated by and described with respect to FIG. 3A.

At step 470, process 400 may include obtaining a second result of functionality of the client application based on the encrypted cookie. The client application may send an indication to proxy resource 130 of the client application's functionality based on the unencrypted cookie. For example, the unencrypted cookie may improve the functionality of the client application, as illustrated by and described with respect to FIG. 3B.

At step 480, process 400 may include generating a comparison of the first result based on the encrypted cookie and the second result based on the unencrypted cookie. The comparison may be a before-and-after comparison comparing the results before and after the cookie is encrypted. In other words, the comparison may indicate of whether the results are the same or different when the same cookie is encrypted or unencrypted. In some embodiments, if the results are different, the comparison may also include an indication of how the client application or the user experience provided by the client application was affected by the encrypted cookie. For example, if the encrypted cookie adversely affected the function of the client application, this may be indicated by the comparison. In some embodiments, a comparison in operation 480 may indicate the ability of the client application to load data, toolbars, plugins, interfaces, or documents. Additionally, or alternatively, the comparison may indicate the ability of the client application to make external connections. For example, as described above with respect to FIGS. 3A and 3B, the client application may not be able to connect to the target application when certain cookies are encrypted.

As an example, the comparison in operation 480 may be generated by comparing the HTTP response from the target resource 110 for each connection. For example, in response to receiving an encrypted cookie, client device 120 may send a reply to proxy resource 130. Proxy resource 130 may forward the reply of client device 120 to target resource 110. In response, target resource 110 may then generate a certain HTTP response, which is sent to proxy resource 130. Proxy resource 130 may receive a different HTTP response from target resource 110 when the cookies are sent in unencrypted form. Accordingly, the HTTP responses from target resource 110 may be compared to generate the comparison.

As another example, the comparison in operation 480 may be generated by analyzing both of the responses from the target application for errors. For example, if no errors are found in either response, the client device may be deemed able to receive either the encrypted or unencrypted cookie.

In some embodiments, the comparison of the first result and the second result in operation 480 may be used in future executions of processes 200 or 400. For example, proxy resource 130 may use the comparison at step 230 of process 200 or step 430 of process 400 to determine whether a cookie should be encrypted. In some embodiments, the comparison may be used to train a machine learning algorithm. For example, if comparison 480 indicates that the results of functionality are the same for the encrypted and unencrypted versions of the same cookie, proxy resource 130 may learn that this cookie should be transmitted in encrypted form. Conversely, if the comparison 480 indicates that the results of functionality are different for the encrypted and unencrypted versions, proxy resource 130 may learn that the cookie should be transmitted in unencrypted form.

Figure 5:
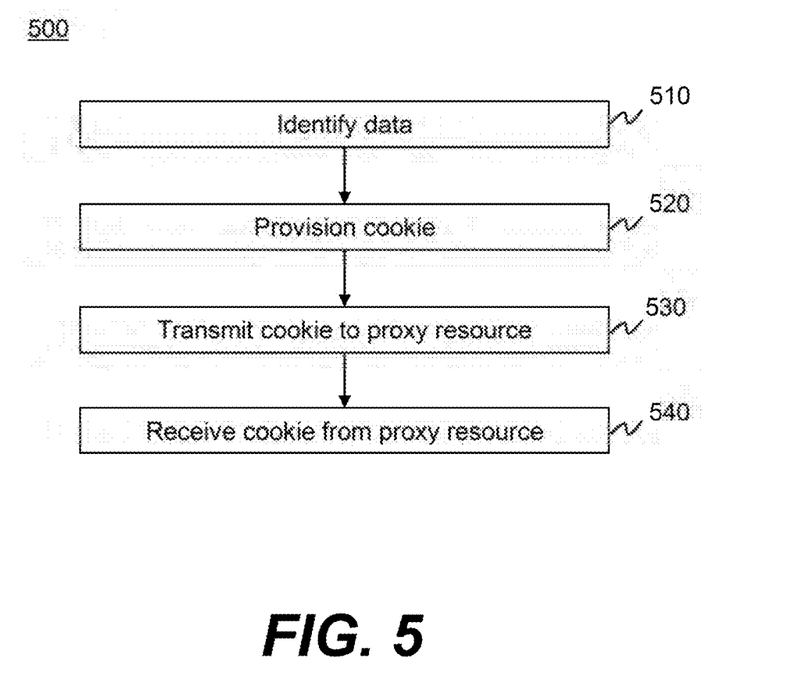
FIG. 5 is a flowchart depicting an exemplary process for provisioning cookies for a proxy resource in accordance with disclosed embodiments.

FIG. 5 is a flowchart depicting an exemplary process 500 for provisioning cookies for a proxy resource 130 in accordance with disclosed embodiments. Parts of process 500 may correspond to parts of process 200 in FIG. 2 and process 400 in FIG. 4 and, accordingly, descriptions of the components and processes therein may apply to process 500 as well. Process 500 may be executed by target resource 110. Target resource 110 may use process 500 to identify data to be placed in cookies for sending to a client application through a proxy resource 130. The client application may then use the data and the cookies may be transmitted back to target resource 110 through proxy resource 130.

At step 510, process 500 may include identifying a data value or parameter to be transmitted in a cookie to a client application. Identifying data may include determining the type and format of the cookie to be transmitted, for example a session cookie, HTML cookie, Java cookie, Flash cookie, etc. The identifying in operation 510 also may include determining the data value or values of the cookie. Data values may include a user identifier, session management data, user preferences, and the like, as discussed above. Target resource 110 may identify data value in response to receiving an access request from client device 120. In some embodiments, an access request may be sent from client device 120 to proxy resource 130. Proxy resource 130 may then send the access request to target resource 110.

At step 520, process 500 may include provisioning a cookie for a client application. Provisioning a cookie may include creating the cookie for the client application according to the information identified at step 510 (e.g., cookie type, file type, data value(s), etc.). The provisioning may occur at a system hosting a target application (e.g., target resource 110) with which the client application is configured to communicate.

At step 530, process 500 may include transmitting the cookie to a proxy resource 130. As described above with respect to FIGS. 2 and 4, proxy resource 130 may be configured to inspect one or more attributes of the cookie and selectively determine, based on the attributes whether to encrypt the cookie. The selective determining may occur based on a machine learning algorithm, for example a statistical classification algorithm. In some embodiments, the machine learning algorithm may be manually trained. Alternatively, or additionally, the machine learning algorithm may be dynamically trained over time. Proxy resource 130 may be configured to send the cookie to the client application. As described above, proxy resource 130 may be configured to make the selective determination before transmitting the cookie to the client. As described above with respect to FIGS. 2-4, the client application may be configured to use the cookie for at least part of its functionality. In some cases, the client application may be configured to use the cookie in an unencrypted form for functionality it could not perform with the cookie in encrypted form. For example, the client application may not be able to load a webpage using the encrypted form of the cookie (e.g., FIG. 3A), but may be able to load the webpage using the unencrypted form of the same cooked (e.g., FIG. 3B).

At step 540, process 500 may include receiving a cookie from proxy resource 130. As described above with respect to FIG. 2, proxy resource 130 may be configured to receive the transmitted cookie back from client application. Proxy resource 130 may be configured to decrypt the received cookie (if encrypted) and transmit it back to target resource 110. In some embodiments, the target application may be configured to use the cookie for at least part of its functionality. For example, upon receiving the cookie from proxy resource 130, the target application may use the cookie data to complete authorization of a user requesting access to the target application via client device 120.

A potential use case of the disclosed embodiments is described below. It is understood that this use case is provided by way of example only and is not limiting of the present disclosure.

One potential implementation of the disclosed embodiments may be to provide increased security and functionality to a client application connecting to target application. For example, a user may attempt to access a secure target application stored on a remote server (target resource 110) using a personal computer (client device 120). A proxy server (proxy resource 130) may be configured to intercept communications from client devices 120 before they reach target resource 110. In some cases, the user may not even be aware that the proxy server is acting as a secure intermediary between the client device 120 and the target resource 110.

Proxy server 130 may forward the access request to target resource 110. In response to the access request, the target application may identify data to be transmitted to the client device and provision one or more cookies containing the data. For example, the data may include a unique identifier of the client device, parameters for the client application, etc. The target application may then send the cookies to the proxy resource 130. Proxy resource 130 may then inspect the attributes of the received cookies and selectively determine which of the cookies, if any, should be encrypted and which should not be encrypted. Proxy resource 130 may then encrypt some of the cookies, but not encrypt others, and may send the cookies to the client application.

Upon receiving the cookies, client application may use some of the data within the cookies for functionality on the client side. For example, a cookie may include data related to a timeout or data used to load and display the webpage providing a user interface for the target application. The client application may access the data within the unencrypted cookies and use it to complete the functionality of the client application.

Proxy resource 130 may also send both the encrypted and unencrypted versions of the cookie to the client application. Client application may send an indication of functionality in each case back to the proxy resource 130, which the proxy resource may use to generate a comparison of the functionality corresponding to the encrypted and unencrypted versions. If the functionality is compromised by sending the encrypted cookie, proxy resource 130 may learn to send the unencrypted version of the cookie in future communications.

After receiving the cookies, the client application may transmit the cookies back to proxy resource 130. Proxy resource 130 may then decrypt the encrypted cookies and send the cookies back to the target application. Upon receipt of the cookies, the target application may confirm that the cookies contain the required data and grant the user access. Thus, by using cookies to facilitate the session connection, some of which are encrypted and some of which are not, the target application may grant access to the user without negatively affecting the user's experience of the client application. Malicious users cannot intercept the data in the encrypted cookies (e.g., the user identifier used for authentication), but the client application is still able to access the data needed to optimize functionality and the user experience.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of Illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A proxy resource configured for deployment between a client application and a target application, the proxy resource being configured to selectively encrypt cookies exchanged between the client application and the target application through software-based operations comprising:
   receiving at the proxy resource, from the target application, a cookie that was provisioned for the client application;
   inspecting one or more attributes of the cookie; and
   selectively determining, before sending the cookie to the client application, and based on the one or more attributes and an effect of an encrypted version of the cookie on an ability of the client application to provide functionality indicative of a visible user experience, the effect being caused by an inability of the client application to validate one or more attributes of the cookie or use a value of the cookie, whether to encrypt the cookie.

2. The non-transitory computer readable medium of claim 1, wherein the software-based operations further comprise:
   encrypting the cookie;
   sending the encrypted cookie to the client application;
   receiving a request, from the client application, for access to the target application, wherein the request includes the encrypted cookie;
   decrypting the encrypted cookie to generate a decrypted version of the encrypted cookie; and
   sending the decrypted version of the encrypted cookie to the target application.

3. The non-transitory computer readable medium of claim 1, wherein the one or more attributes of the cookie include the value of the cookie.

4. The non-transitory computer readable medium of claim 3, wherein the value is defined as at least one of: a number of characters, specific content, or a pattern of content.

5. The non-transitory computer readable medium of claim 1, wherein the one or more attributes of the cookie include a name of the cookie.

6. The non-transitory computer readable medium of claim 5, wherein the name is defined based on at least one of: a whitelist of names, a blacklist of names, or a user-adjustable definition.

7. A computer-implemented method for selectively encrypting cookies exchanged between a client application and a target application, the method comprising:
   receiving at a proxy resource deployed between the client application and the target application, from the target application, a cookie that was provisioned for the client application;
   inspecting one or more attributes of the cookie; and
   selectively determining, before sending the cookie to the client application, and based on the one or more attributes and an effect of an encrypted version of the cookie on an ability of the client application to provide functionality indicative of a visible user experience, the effect being caused by an inability of the client application to validate one or more attributes of the cookie or use a value of the cookie, whether to encrypt the cookie.

8. The computer-implemented method of claim 7, further comprising:
- selectively determining not to encrypt the cookie; and
- providing the cookie, without encryption, to the client application.

9. The computer-implemented method of claim 7, further comprising:
- selectively determining to encrypt a portion but not all portions of the cookie; and
- providing the cookie with the portion encrypted to the client application.

10. The computer-implemented method of claim 7, wherein the proxy resource is a server physically separate from the client application and the target application.

11. The computer-implemented method of claim 7, further comprising developing a before-and-after comparison, comprising:
- selectively determining to provide the cookie without encryption to the client application;
- selectively determining to provide the cookie with encryption to the client application;
- obtaining a first result of functionality of the client application based on the cookie without encryption;
- obtaining a second result of functionality of the client application based on the cookie with encryption; and
- generating a comparison of the first result to the second result.

12. The computer-implemented method of claim 11, wherein the comparison indicates an ability of the client application to load data or documents.

13. The computer-implemented method of claim 11, wherein the comparison indicates an ability of the client application to make external connections.

14. A non-transitory computer readable medium storing executable instructions that, when executed by at least one processor, cause the processor to perform operations for provisioning cookies to a proxy resource that selectively encrypts cookies, the operations comprising:
- provisioning a cookie for a client application;
- transmitting the cookie to a proxy resource that is configured to inspect one or more attributes of the cookie and selectively determine, before sending the cookie to the client application, and based on the one or more attributes and an effect of an encrypted version of the cookie on an ability of the client application to provide functionality indicative of a visible user experience, the effect being caused by an inability of the client application to validate one or more attributes of the cookie or use a value of the cookie, whether to encrypt the cookie.

15. The non-transitory computer readable medium of claim 14, wherein the selectively determining is based on a machine learning algorithm.

16. The non-transitory computer readable medium of claim 15, wherein the machine learning algorithm is a statistical classification algorithm.

17. The non-transitory computer readable medium of claim 15, wherein the machine learning algorithm is a manually trained algorithm.

18. The non-transitory computer readable medium of claim 14, wherein the provisioning occurs at a system hosting a target application with which the client application is configured to communicate.

19. The non-transitory computer readable medium of claim 18, wherein:
- the client application is configured to use the cookie to perform at least a part of the client application functionality; and
- the target application is configured to use the cookie to perform at least a part of a functionality of the target application.

* * * * *